US006766360B1

(12) United States Patent
Conway et al.

(10) Patent No.: US 6,766,360 B1
(45) Date of Patent: Jul. 20, 2004

(54) CACHING MECHANISM FOR REMOTE READ-ONLY DATA IN A CACHE COHERENT NON-UNIFORM MEMORY ACCESS (CCNUMA) ARCHITECTURE

(75) Inventors: Patrick N. Conway, Los Altos, CA (US); Yukihiro Nakagawa, Cupertino, CA (US); Jung Rung Jiang, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 699 days.

(21) Appl. No.: 09/616,583

(22) Filed: Jul. 14, 2000

(51) Int. Cl.[7] .............................................. G06F 15/167

(52) U.S. Cl. ........................ 709/214; 709/104; 709/212; 709/214; 709/215; 709/216; 709/217; 711/121; 711/130; 711/141; 711/200

(58) Field of Search ................................. 709/104, 212, 709/215, 216, 214, 217; 711/141

(56) References Cited

U.S. PATENT DOCUMENTS

| | | | | |
|---|---|---|---|---|
| 4,663,706 A | * | 5/1987 | Allen et al. .................. | 709/234 |
| 5,175,839 A | * | 12/1992 | Ikeda et al. | |
| 5,280,612 A | * | 1/1994 | Lorie et al. ...................... | 707/8 |
| 5,303,362 A | * | 4/1994 | Butts et al. .................. | 711/121 |
| 5,465,338 A | | 11/1995 | Clay | |
| 5,561,780 A | | 10/1996 | Glew et al. | |
| 5,592,671 A | * | 1/1997 | Hirayama | |
| 5,727,150 A | * | 3/1998 | Laudon et al. | |
| 5,761,460 A | | 6/1998 | Santos et al. | |
| 5,829,032 A | * | 10/1998 | Komuro et al. | |
| 5,859,985 A | | 1/1999 | Gormley et al. | |
| 5,887,134 A | | 3/1999 | Ebrahim | |
| 6,006,255 A | * | 12/1999 | Hoover et al. | |
| 6,014,690 A | * | 1/2000 | VanDoren et al. | |
| 6,026,472 A | * | 2/2000 | James et al. | |
| 6,044,438 A | * | 3/2000 | Olnowich .................... | 711/130 |
| 6,055,605 A | * | 4/2000 | Sharma et al. ............... | 711/130 |
| 6,085,293 A | * | 7/2000 | Carpenter et al. ........... | 711/141 |
| 2002/0184345 A1 | | 12/2002 | Masuyama et al. | |
| 2002/0186711 A1 | | 12/2002 | Masuyama et al. | |
| 2003/0005156 A1 | | 1/2003 | Miryala et al. | |
| 2003/0007457 A1 | | 1/2003 | Farrell et al. | |
| 2003/0007493 A1 | | 1/2003 | Oi et al. | |
| 2003/0023666 A1 | | 1/2003 | Conway et al. | |

OTHER PUBLICATIONS

Abandah, Gheith A., and Davidson, Edward S., Effects of Architectural and Technological Advances on the HP/Convex Exemplar's Memory and Communications Performance, IEEE 1998—1063–6897, pp. 318–329.

(List continued on next page.)

*Primary Examiner*—Hosain Alam
*Assistant Examiner*—Young N Won
(74) *Attorney, Agent, or Firm*—Fenwick & West LLP

(57) ABSTRACT

A computer network system for manipulating requests for shared data includes a plurality of groups and each group has a plurality of nodes and each node has a plurality of processors. The system further comprises a request outstanding buffer (ROB) for recording data requests, a remote access cache (RAC) for caching the results of prior memory requests which are remote to a requesting node, and a directory for recording a global state of a cache line in the system. The RAC supports only two states, Shared and Invalid, and caches only clean remote data. If the directory state is Modified/Exclusive, the line is indicated to not be in the RAC. The behavior of the RAC is described for two important cases: initial RAC does not have the line caches and initial RAC has the line cached. The requested data is supplied to the requesting node from the RAC when the RAC's line is cached and when the RAC's line is not cached, the requested data is supplied from the remote home node and the requested data is installed in the RAC. In the case when the data is not present in the RAC, the request to the remote home node is overlapped with the RAC access to minimize remote memory access latency.

8 Claims, 7 Drawing Sheets

OTHER PUBLICATIONS

Falsafi, Babak and Wood, David A., Reactive NUMA: A Design for Unifying S–COMA and CC–NUMA, ISCA '97, CO, USA, pp. 229–240.

Geralds, John in Silicon Valley. Sun enhances partitioning in Starfire Unix server. Dec. 08, 1999 VNU Business Publishing Limited [retrieved on Apr. 11, 2001]. Retrieved from the internet: URL:http://www.vnunet.com/print/104311.

IBM. The IBM NUMA–Q enterprise server architecture. *Solving issues of latency and scalability in multiprocessor systems*. Jan. 19, 2000, 10 pages.

Lovett, Tom and Clapp, Russell; StiNG: A CC–NUMA Computer System for the Commercial Marketplace; ISCA '95, PA, USA, pp. 308–317.

Servers White Paper. *Sun Enterprise™ 1000 Server: Dynamic System Domains*. Sun Microsystems, Inc., Palo Alto, CA, USA. 2001. [retrieved on Apr. 11, 2001]. Retrieved from the internet: URL:http://www.sun.com/servers/white-papers/domains.html?pagestyle=print.

Unisys White Paper. *Cellular Multiprocessing Shared Memory: Shared Memory and Windows*, Sep. 2000, pp. 1–16.

Willard, Christopher, an IDC White Paper. *Superdome— Hewlett–Packard Extends Its High–End Computing Capabilities*, (2000), pp. 1–20.

Abandah, Gheith A., et al.; *Effects of Architectural and Technological Advances on the HP/Convex Exemplar's Memory and Communication Performance*, pp. 318–329; 1998 $25^{th}$ International Symposium on Computer Architecture.

FALSAFI, Babak, et al.; *Reactive NUMA: A Design for Unifying S–COMA and CC–NUMA*; pp. 229–240; 1997 $24^{th}$ International Symposium on Computer Architecture.

Lovett, Tom, et al.; *StiNG: A CC–NUMA Computer System for the Commerical Marketplace*; pp. 308–317; 1996 $23^{rd}$ International Symposium on Computer Architecture.

\* cited by examiner

| | Directory Entry Format | |
|---|---|---|
| STATE = I | | Transaction Id |
| STATE = S | SHARING LIST | Transaction Id |
| STATE = ME | OWNER | Transaction Id |

FIG. 3

CACHING MECHANISM FOR REMOTE READ-ONLY DATA IN A CACHE COHERENT NON-UNIFORM MEMORY ACCESS (CCNUMA) ARCHITECTURE

FIELD OF THE INVENTION

The present invention relates generally to a memory access and more particularly, to a system and a method for manipulating requests for shared data in a multi-node computer network system.

BACKGROUND OF THE INVENTION

Conventional cache coherent non-uniform memory access ("CC NUMA") is known. In a multi-node system+ using non-uniform memory access, if a central processing unit ("CPU") accesses memory at its own node, i.e., a local node, the time to access data is fast. By contrast, in a non-uniform memory access at a node other than the central processing unit's own node, i.e., a remote node, the time to access the data is slow.

A conventional protocol referred to as Modified/Exclusive, Shared, Invalid ("MESI") evolved to help to increase data access speed. In this protocol, a memory controller stores and keeps track of information about data in a multi-node system. It determines on which node data is presently residing in multi-node systems.

The Remote Access Cache (RAC) caches the data for remote requests in order to speed access to remote data by a subsequent memory request from a node in the same group.

In a conventional cache coherent non-uniform memory access ("CC NUMA") when a first processor issues a "read-to-share" or a "read-to-own" request to remote memory, it first needs to access the Remote Access Cache (RAC) and then to access the directory for the remote memory agent. A problem with this approach is that it serializes the RAC access and the remote directory access. The existing approach increases remote memory latency by not allowing overlap of these two operations.

Further, the data in the RAC could be present in the Modified (M) or Exclusive (E) state. If the RAC has the line in E state, then it has "read-write" permission for its copy of the line, but it has not yet written to the line. If the RAC is in M state, then it has "read-write" permission for its cached copy of the line and it has already modified the line. When the most recent data is in the RAC, and the state of the cache line is M and the RAC supplies the cache line in response to a "read-to-share" or "read-to-own" request. A remote "read-to-share" request which hits a line in the M state in the RAC must downgrade the line state from M to S by writing the line back to memory and return a shared copy to the requestor. A remote "read-to-own" request must send an ownership transfer notification to the directory to indicate who the new owner of the line is. Ownership transfer notification is required because the directory must always track which cache is the exclusive owner of a cache line in the ME state at the directory. However, ownership transfer complicates the protocol.

If the remote "read-to-share" access misses in the RAC, a line which has been modified may first need to be evicted from the RAC in order to create space for the new line to be installed in the RAC. The possibility of cache line eviction requires that the RAC must be read on every "read-to-share" or "read-to-own" access.

In addition, because a cache line can only be present in exactly one RAC in the system in the Exclusive and Modified state, performance does not scale well with a large number of RACs. Once the number of RACs in the system increases, the odds of hitting Exclusive or Modified data in the RAC decline.

Therefore, there is a need for a memory access system and method that reduces latency of remote memory accesses. Such a new system should provide congestion relief by bypassing the RAC when it is busy. In addition, such a new system should simplify the protocol by eliminating eviction of Modified data from the RAC and should eliminate ownership transfer notification of the directory anytime writeback or a HIT to Modified or Exclusive data occurs. Most importantly, such a system should avoid serializing the RAC access and the memory access, thereby reducing memory latency.

SUMMARY OF THE INVENTION

A preferred embodiment of the present invention includes a computer network system for accessing data that includes a plurality of groups, each group including a plurality of nodes that couple through an interconnect system, each node including one or more central processing units (or processors) with each processor having a processor cache. Each node further includes a memory agent, a main memory, and a directory coupled to the processors and processor caches.

The system also includes a directory coupled to a Request Outstanding Buffer (ROB) to record the progress of a memory transaction in the system. A cache line is the smallest unit of data that can be stored in cache and tracked by the directory. Data is supplied through the cache line. The information stored in the directory refers to which node(s) has a particular cache line as well as the status of data in those cache lines. The status of data in the cache line at the directory may be, for example, Modified/Exclusive ("ME"), shared ("S"), or invalid ("I"). Modified/Exclusive state indicates that the line has been read by a caching memory agent for read-write access. Shared state indicates that the line has been read by a caching memory agent for read-only access. Invalid state indicates that the line is not cached in any cache in the system. If the directory state is Modified/Exclusive (ME), the owning node is also recorded in the directory entry. If the directory state is Shared (S), a list of sharing nodes is recorded in the directory entry.

The system further comprises the ROB coupled to a memory agent to record the progress of a data requests. The ROB may be connected to remote nodes through the global interconnect system. Entries in the ROB include the following fields: REQUEST, STATE, and TRANSACTION ID.

The system further includes a remote access cache (RAC) to cache remote memory references. The RAC caches only clean remote data in S state and does not cache remote data in the ME state. Entries in the RAC include the following fields: ADDRESS TAG, STATE, and DATA.

A preferred method for accessing data comprises: requesting "read-to-share" data from a memory line in a remote node; issuing simultaneously two requests: to the RAC and to the directory for the remote memory node; returning MISS back to the ROB if the cache line in the RAC is not cached; returning data to the requesting processor in group A from the remote memory node and installing the cache line in the RAC. Alternatively, if the cache line in the RAC is cached, returning a RAC HIT to the ROB. The fact that there is a "HIT" in the cache indicates that the state of the line in the directory is Shared, but not Modified/Exclusive, or Invalid. Then, modifying the STATE field in the ROB accordingly to indicate whether the cache line is cached in the RAC. Finally, returning data to the requesting node. The data received by the ROB from the remote node is discarded once the original request is satisfied with the memory line cached in the RAC.

In the present invention, the "read-to-share" request from the first processor is issued to the RAC and is also simultaneously issued to a remote home node. Overlapping these two operations avoids serializing the RAC access and the memory access. This beneficially reduces memory latency for the case when the RAC access is a MISS. Thus, if the "read-to-share" access from a processor node hits in the cache, then data can be returned and used immediately by the processor without waiting for a response from the directory controller at the remote home node. The fact that there is a HIT in the RAC indicates that the state of the line in the directory is Shared, and not Modified/Exclusive, or Invalid. Since the data in the RAC is only Shared, this obviates the need to wait for the result of the directory lookup.

The present invention also beneficially simplifies the protocol by eliminating evictions of data in the RAC before installing the new cache line. Further, the present invention allows congestion relief since the RAC can be bypassed whenever the RAC is busy. In this situation, the "read" request goes directly to the remote home node bypassing the RAC. Data is then returned directly to the requestor and is not installed in the RAC. This is possible because if the cache line is present in the RAC, then it is in the shared state. The data in the RAC is always a copy of the data in the memory. Therefore, the data can be returned from the memory when the RAC is bypassed.

Next, the RAC mechanism of the present invention provides a greater degree of fault tolerance without incurring any performance overhead since a RAC access error can be simply treated as a RAC MISS. When the data from memory is installed, the error is corrected with no additional overhead.

Finally, the presence of the RAC does not increase memory access latency. That is, the latency to remote memory with a RAC MISS is the same as the latency to remote memory without a RAC. Therefore, the RAC can only provide a benefit of performance, even if the miss rate of the RAC is high.

BRIEF DESCRIPTION OF THE DRAWINGS

FIG. 3 pictorially illustrates directory entry format recording the global state of a cache line in the system in accordance with the present invention.

DERAILED DESCRIPTION OF THE INVENTION

Figure 1:
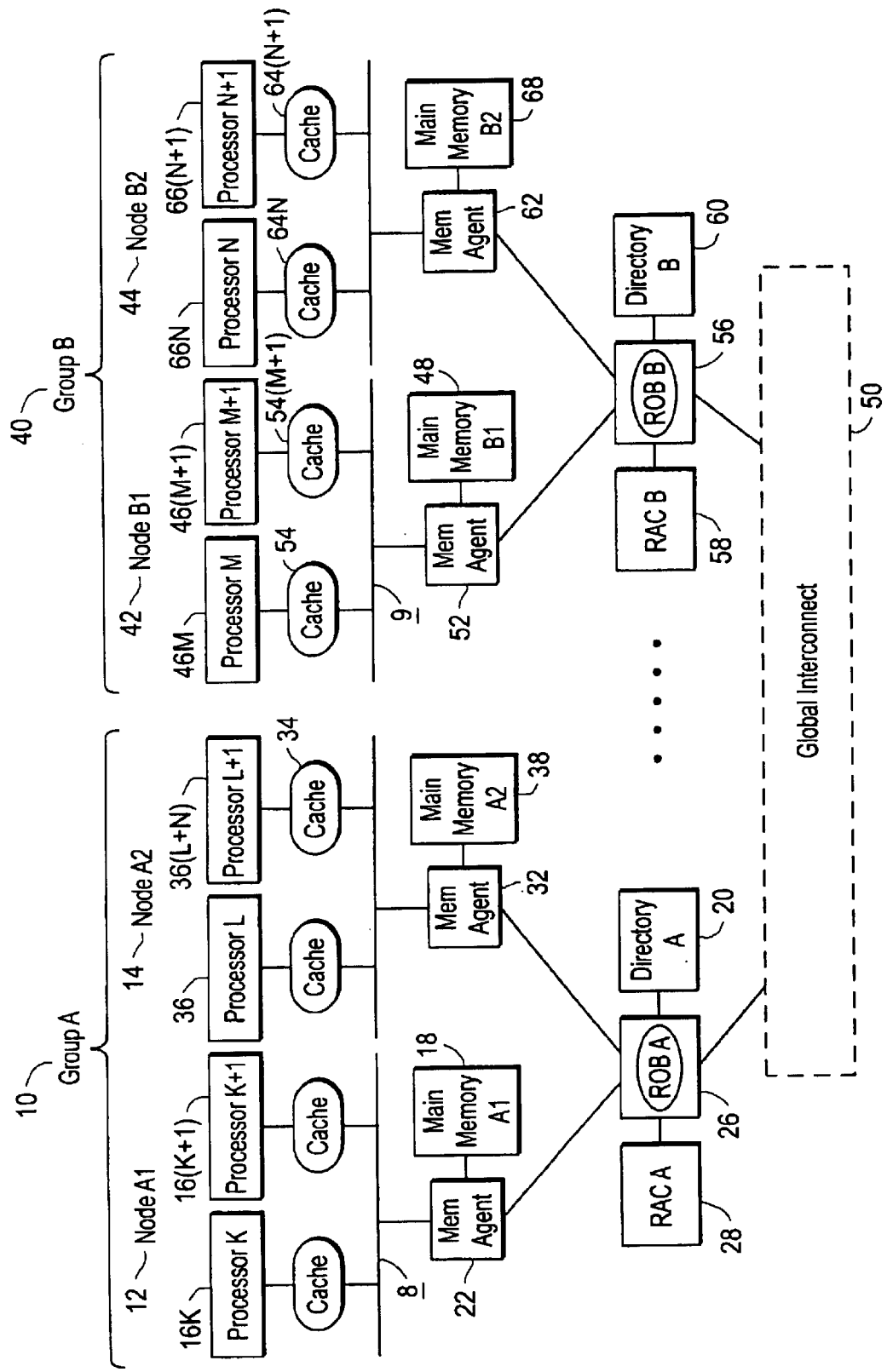
FIG. 1 is a block diagram of one embodiment of an overall architecture of a multi-node network system in accordance with the present invention.

The present invention is a system and a method for manipulating requests for shared data from a remote access cache (RAC) or from a remote node. Figure (FIG.) 1 is a block diagram of one embodiment of an overall architecture of a multi-node network system in accordance with the present invention. The multi-node network system includes two local interconnect systems for group A (10), having the first 12 and the second node 14, and for group B (40), having the first node 42 and the second node 44. The two local interconnect systems are connected through a global interconnect 50.

In the Group A (10), the first 12 and the second 14 node are coupled to each other through an interconnect system 8. The first node 12 includes a memory agent 22, a main memory 18, a directory 20, one or more processors 16K-16 (K+m) (generally 16), a request outstanding buffer (ROB) 26 and a remote access cache (RAC) 28. Each processor 16 includes a processor cache 24K-24 (K+m) (generally 24). The caches 24 of processors in the first node are coupled with the memory memory agent 22. The main memory 18 in the first node 12 is coupled with the memory agent 22. The directory 20 and the RAC 28 are coupled with the ROB 26, which is coupled to the memory agent 22.

The second node 14 includes an memory agent 32, a main memory 38, a directory 20, one or more processors 36L-36 (L+n) (generally 36), a request outstanding buffer (ROB) 26 and a remote access cache (RAC) 28. Each processor 36 includes a processor cache 34L-34 (L+n) (generally 34). The caches 34 of processors in the second node 14 are coupled with the memory agent 32. The main memory 38 in the second node 14 is coupled with the memory agent 32. The directory 20 and the RAC 28 are coupled with the ROB 26, which is coupled to the memory agent 32.

In the Group B (40), the first node 42 and the second node 44 are coupled to each other through an interconnect system 9. The first node 42 in Group B (40) includes a memory agent 52, a main memory 48, a directory 60, one or more processors 46M-46(M+m) (generally 46), a request outstanding buffer (ROB) 56 and a remote access cache (RAC) 58. Each processor 46 includes a processor cache 54M-54 (M+m) (generally 54). The caches 54 of processors in the first node 42 are coupled with the memory agent 52. The main memory 48 is coupled with the memory agent 52. The directory 60 and the RAC 58 are coupled with the ROB 56. The ROB 56 is coupled to the memory agent 52.

The second node 44 in Group B (40) includes an memory agent 62, a main memory 58, a directory 60, one or more processors 66N-66(N+n) (generally 66), a request outstanding buffer (ROB) 56 and a remote access cache (RAC) 58. Each processor 66 includes a processor cache 64N-64 (N+n) (generally 64). The caches 64 of processors in the second node 44 are coupled with the memory agent 62. The main memory 68 is coupled with the memory agent 62. The directory 60 and the RAC 58 are coupled with the ROB 56. The ROB 56 is coupled to the memory agent 62.

It is noted that in each node 12, 14, 42, 44, the processor may be a conventional processor, for example, Intel Pentium®-type processor, Sun SPARC®-type processor, a Motorola PowerPC®-type processor or the like. The processor cache 24, 34, 54, 64 may be a conventional processor cache. The main memory 18, 38, 48, 68 may be conventional memory, for example, a dynamic random access memory (DRAM).

The memory agent 22, 32, 52, 62 interfaces the processor to main memory 18, 38, 48, 68. The memory agent is a memory controller which reads and writes DRAM. The DRAM could be either conventional DDR-SDRAM or RDRAM.

The ROB 26, 56 may be a conventional buffer for tracking a new data request. The directory 20, 60 may be a conventional directory to record the global state of a cache line in the system. The information in the directory 20, 60 may be structured in a table or chart format as pictorially illustrated by FIG. 3. The directory 20, 60 may be embodied in software, firmware, hardware or a combination of software, firmware, and/or software. The directory 20, 60 is configured to store information regarding the status of a cache line. A cache line is the smallest unit of data that can be stored in cache and tracked by the directory. Data is supplied through the cache line. The information stored in the directory refers to which node(s) has a particular cache line as well as the status of data in those cache lines.

Figure 2:
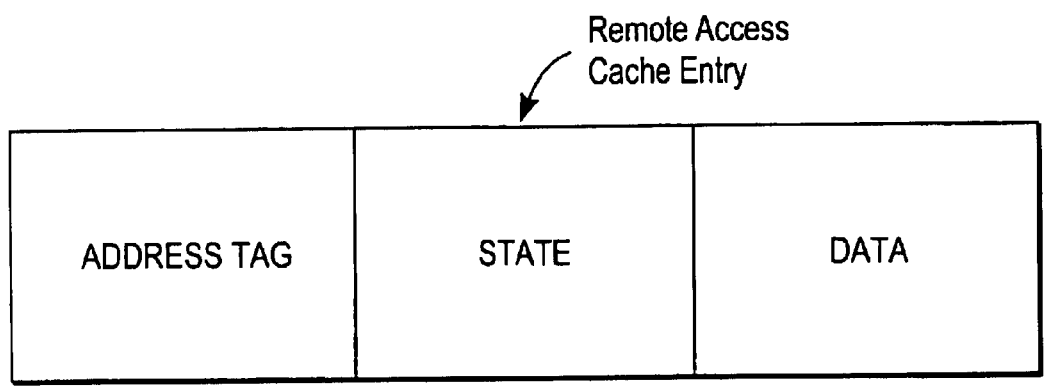
FIG. 2 pictorially illustrates remote access cache (RAC) entries in accordance with the present invention.

The remote access cache 28, 58 is a conventional processor cache modified to support two states, Shared and Invalid. It caches only clean remote data. Referring now to FIG. 2, there is illustrated a RAC entry comprising the following fields: ADDRESS TAG, STATE, and DATA.

The ADDRESS TAG field is matched with the address of a "read-to-share" request to determine if the RAC access is a HIT or MISS.

The STATE field records the state of the cache line. The RAC supports two states, Shared and Invalid, and caches only clean remote data. If the directory state is Modified Exclusive Shared/Invalid ("MESI") for a cache line, the cache line cannot be present in the RAC. A HIT in the RAC indicates that the state of the cache line in the directory is Shared, but not Modified, Exclusive or Invalid. In contrast, a MISS in the RAC indicates that the state of the cache line in the directory is not Shared. The DATA field is present to cache clean remote data.

Referring now to FIG. 3, it pictorially illustrates directory entry format recording the global state of a cache line in the system in a tabular format. The table may include the state of a cache line in a directory by representing it as shared ("S") (the line may be present in multiple caches in the system and the data may be supplied by memory agent or one of the caches), modified ("M") (line is present in one cache which supplies the data), or invalid ("I") (the data is not being supplied or shared), or exclusive ("E") (the line is present in one cache in the system, data may be supplied by memory agent or the cache and the state of the line is downgraded from E to S). Further, the directory maintains a Sharing List. If the state of a cache line is Shared, then the directory marks a requesting node as a Sharer and adds that node to the Sharing List. In addition, the directory entry includes a TRANSACTION ID field, which is used to associate messages with a particular outstanding transaction. Every message carries a Transaction ID.

Figure 4:
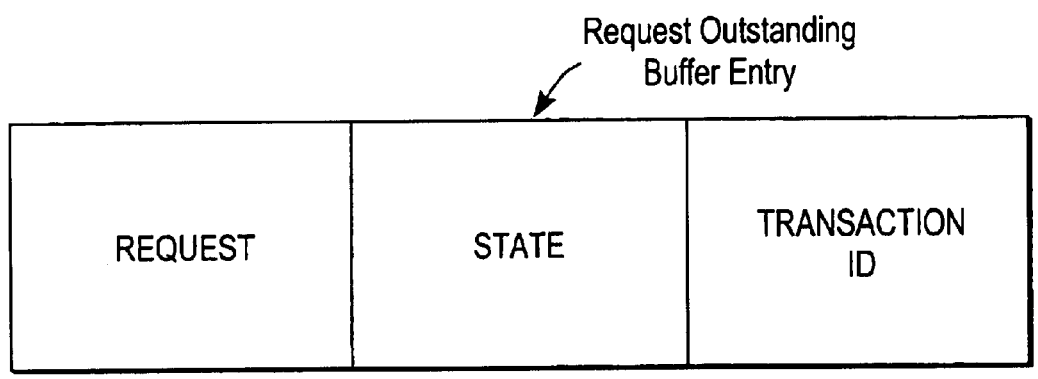
FIG. 4 pictorially illustrates request outstanding buffer (ROB) entries in accordance with the present invention.

FIG. 4 illustrates an entry to record the progress of a transaction in a ROB. The entry in the ROB comprises the following fields: REQUEST, STATE, and TRANSACTION ID.

The "REQUEST" field is present to record the requests coming into and out of the ROB. In particular, this field records a "read-to-share" request issued by a processor in the requesting node to a memory line in the remote home node. Also, when the ROB issues a "look up" request, it is recorded in the "REQUEST" field.

Figure 7:
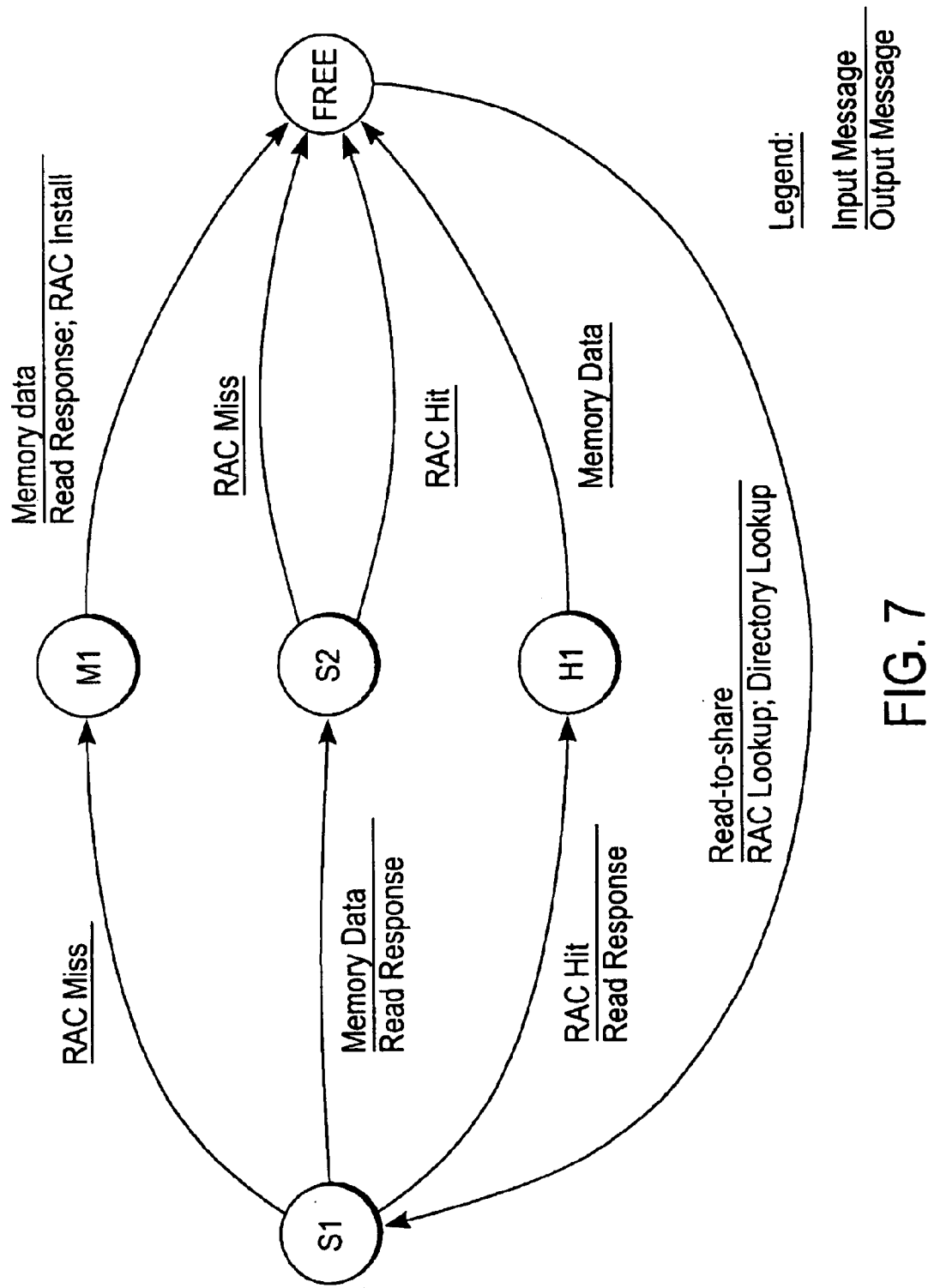
FIG. 7 is a state transition diagram for the request outstanding buffer (ROB) in accordance with the present invention.

The ROB implements a finite state machine. The STATE field in the ROB shows the current state of the ROB finite state machine. A state transition diagram for the ROB is illustrated in FIG. 7. In FREE state, a read-to-share request causes allocation of a free ROB entry and a transition to state S1. A RAC lookup message is issued to the RAC and a Directory lookup message is simultaneously issued to the directory for the home node. In S1 state, a RAC MISS causes a transition to M1 state. In S1 state, a Memory Data causes a transition to S2 state and a Read Response is returned to the requesting processor. In S1 state, a RAC HIT causes a transition to H1 state. A Read Response is returned to the requesting processor. In S2 state, a RAC MISS causes a transition to FREE state and the ROB entry is deallocated. In S2 state, a RAC HIT causes a transition to FREE state, the data is discarded and the ROB entry is deallocated.

The TRANSACTION ID field uniquely identifies each transaction and is used to distinguish between messages belonging to unrelated transaction flows. Each message carries a TRANSACTION ID field which is used to associate the message with a particular transaction.

Figure 5:
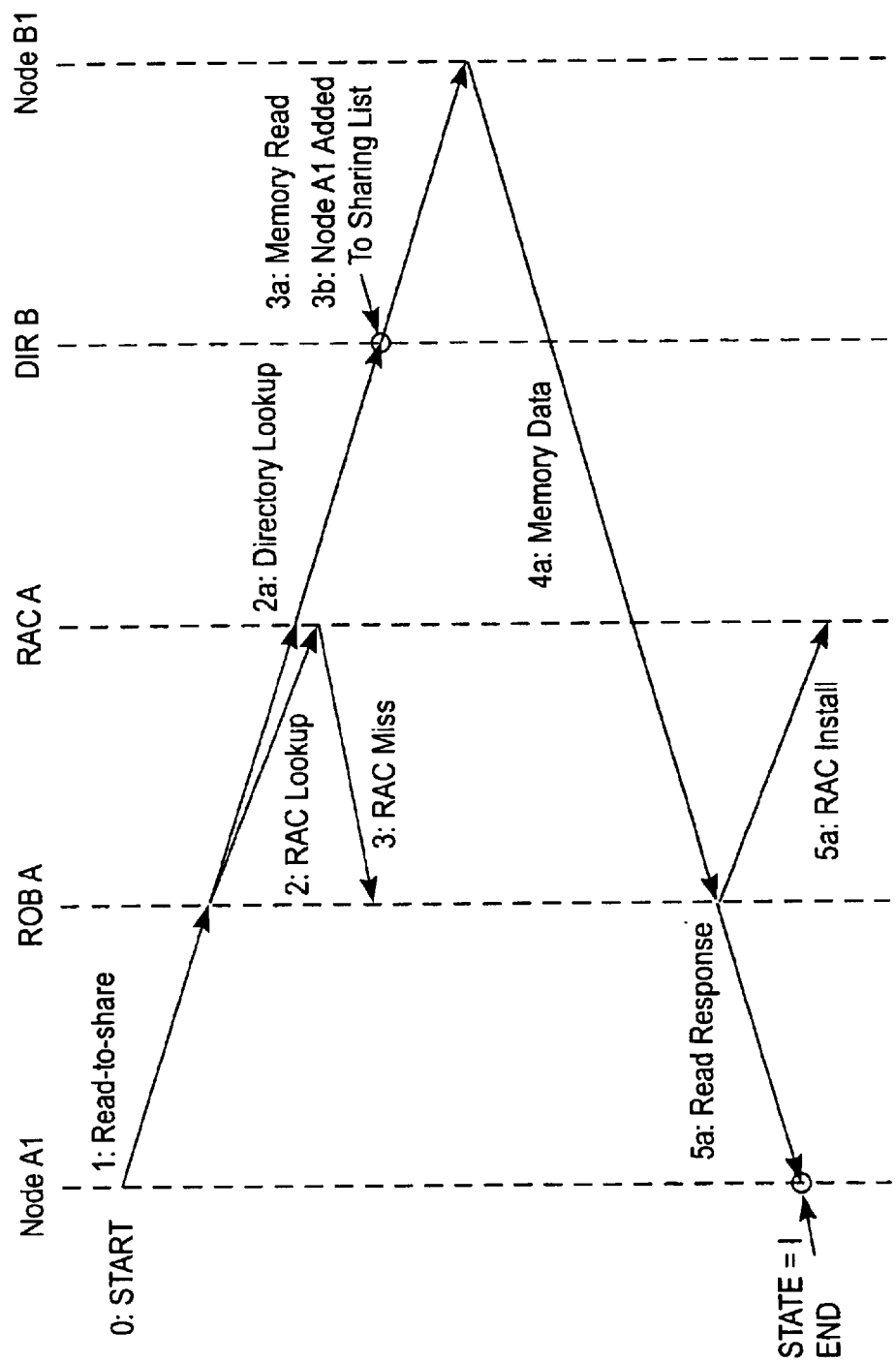
FIG. 5 is a flow diagram of one embodiment of a process for manipulating requests for shared data when a cache line is not being cached in a remote access cache (RAC) in accordance with the present invention.

Referring now to FIG. 5, there is illustrated a flow diagram of one embodiment of a process for manipulating requests for shared data when a cache line is not being cached in the RAC in accordance with the present invention. Once the process starts 0, a first processor 16 in the first node 12 in group A (10) issues a "read-to-share" request 1 for data to the ROB 26. The "read-to-share" request is allocated an entry 1 in the ROB 26. The STATE field of the ROB transitions to S1 state.

Once the request is received, the ROB 26 simultaneously issues a first request 2 to the RAC 28, which is responsible for satisfying subsequent "read-to-share" requests to that cache line from nodes which access the RAC 28, and issues a second request 2a to the directory 60 for the Group B (40) for the remote home node 42. The address includes the destination node. If the cache line in the RAC 28 is not being cached, the RAC 28 returns 3 RAC MISS back to the ROB 26. That is, the RAC 28 reports that it does not have the cache line requested. In response, the ROB 26 transitions the STATE field to M1 state to indicate that a RAC MISS occurred and that the RAC 28 did not satisfy the request.

Once the directory 60 has received the lookup request 2a, it looks up the state of the cache line, which is Invalid. The directory 60 issues a "memory read" request 3a to the first remote node 42 and transitions the state of the directory entry for the requested cache line from an Invalid state to a Shared state. Further, the directory 60 adds the first node 12 in group A (10) to the list of sharers for this cache line 3b.

Next, the first remote node 42 returns data 4a to the ROB 26 in the requesting node through the global interconnect system 50. The ROB 26, in turn, returns data 5a to the processor 16 in group A (10). Also, the ROB 26 installs data 5a in the RAC 28 so that it will be available to nodes in the same group which subsequently access the RAC 28 when the RAC 28 receives the next "read-to-share" request. At this point the processor "read-to-share" request has been satisfied. According to the present invention, it is not necessary to first evict the entry from the RAC 28 before installing the new cache line because the new cache line is installed in the RAC 28 by simply overwriting existing entry with a new entry. In addition, the entry in the ROB 26 is deallocated and its STATE transitions to FREE state. The process then ends 6.

It should be noted that if the RAC is busy, the RAC can simply be bypassed and the "read" request goes directly to the remote node. This feature allows the system to respond dynamically to the level of congestion at the RAC. Data is then returned directly to the requestor and is not installed in RAC. This is possible because if the cache line is present in the RAC, then it is in the Shared state. The data in the RAC is always a copy of the data in the memory. Therefore, the data can be returned from the memory when the RAC is bypassed.

Figure 6:
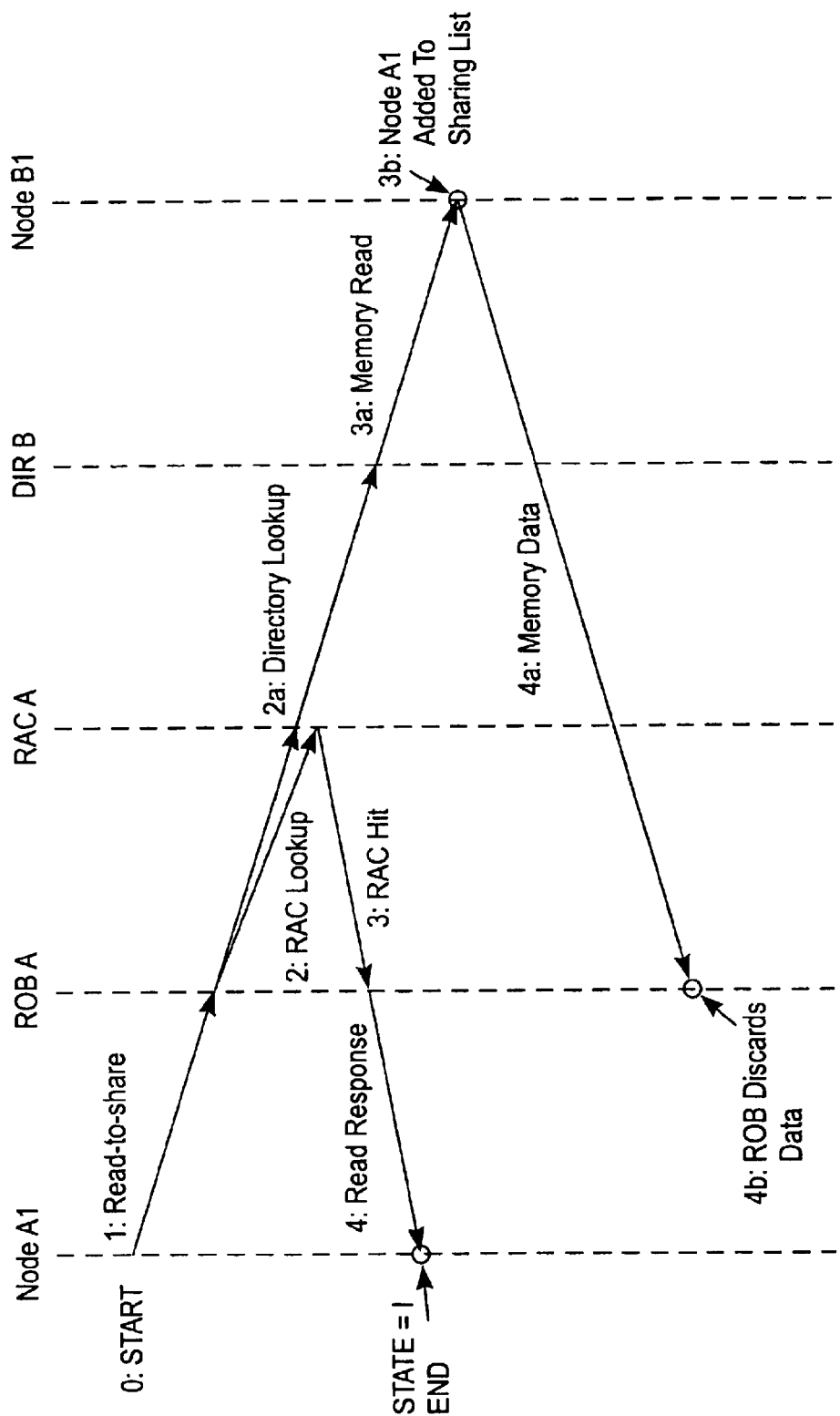
FIG. 6 is a flow diagram of one embodiment of a process for manipulating requests for shared data when a cache line is being cached in a remote access cache (RAC) in accordance with the present invention.

FIG. 6 illustrates a flow diagram of one embodiment of a process for requesting data when the cache line in the RAC is cached in accordance with the present invention. The process starts 0, for example, as a first processor 36 in the second node 14 in group A sends a "read-to-share" request 1 for data to the memory line in the remote node. Address includes node destination. The "read-to-share" request is allocated an entry 1 in the ROB. The STATE field in the ROB entry transitions to S1 state. Once the request is received, the ROB simultaneously issues a first request 2 to the remote access cache 28, which is responsible for satisfying subsequent "read-to-share" requests to that cache line from nodes which access the RAC 28, and a second request 2a to the directory 60 for the remote home node.

If the cache line in the RAC is being cached, it returns a RAC HIT 3 to the ROB 26. The fact that there is a "HIT" in the cache indicates that the state of the cache line in the directory is Shared, but not Modified, Exclusive, or Invalid. Then, the ROB 26 transitions the STATE field to H1 state to indicate that a RAC HIT occurred. That is, the RAC 28 satisfied the request. The data then is returned 4 to the requesting node 14 that issued the "read-to-share" request. At this point the processor "read-to-share" request has been satisfied.

Once the directory 60 has received the lookup request 2a, it looks up the state of the line which is Shared. It sends a "memory read" request 3a to the memory agent 52 for the remote home node 42. Further, the directory adds the second node 14 in group A to the list of sharers for this cache line 3b. Next, the remote home node 42 returns data 4a to the ROB 26 in the requesting node through the global interconnect system 50. The ROB 26, in turn, discards the received data 4b since the original request was satisfied with the memory line cached in the RAC 28. In addition, the entry in the ROB is deallocated by transitioning its STATE field to FREE state. The process then ends 5. It should be noted that if the read access from a processor node "hits" in the cache, then data can be returned and used immediately by the processor without waiting for a response from the directory at the remote node.

What is claimed is:

1. A method for manipulating requests for shared data in a computer network having a plurality of groups of nodes comprising:

receiving a request for shared data from a node within a first group wherein each group of the plurality has a plurality of nodes, each node having a plurality of processors;

issuing simultaneously a first request for the same shared data to a first remote access cache (RAC) for the first group for storing only clean remote data marked Shared indicating read-only access wherein the clean remote data is received from another group in the computer network and a directory lookup request to another group for the same shared data; and responsive to the first remote access cache having the data cached supplying a copy of the requested data from the first remote access cache to the requesting node within the first group, and responsive to receiving the requested data from the other group that received the directory lookup request, discarding the requested data from the other group.

2. A system for manipulating requests for shared data in a computer network having a plurality of groups of nodes comprising:

means for receiving a request for shared data from a node within a first group wherein each group of the plurality has a plurality of nodes, each node having a plurality of processors;

means for issuing simultaneously a first request for the same shared data to a first remote access cache (RAC) for the first group for storing only clean remote data marked Shared indicating read-only access wherein the clean remote data is received from another group in the computer network and a directory lookup request to another group for the same shared data; and means for, responsive to the remote access cache having the data cached, supplying a copy of the requested data from the first remote access cache to the requesting node within the first group, and responsive to receiving the requested data from the other group that received the directory lookup request, means for discarding the requested data from the other group.

3. A system for manipulating requests for shared data between groups of nodes in a computer network comprising:

a first request outstanding buffer (ROB) for a first group wherein each group of the plurality has a plurality of nodes, each node having a plurality of processors and a memory agent, the first ROB being communicatively coupled to receive requests from each respective memory agent for each of the nodes in the first group and being communicatively coupled to a network interface for communicating with a second ROB for a second group of nodes;

a first remote access cache (RAC) for storing for the first group only clean remote data marked Shared indicating read-only access wherein the clean remote data is received from the second group in the computer network, the first RAC being communicatively coupled to the first ROB; and a first directory for the first group of nodes for recording the progress of a memory transaction between the first group and the second group, the first directory being communicatively coupled to the first ROB:

wherein the first ROB issues simultaneously a first request for shared data to the first remote access cache (RAC) for the first group and a directory lookup request to the second group for the same shared data; and wherein responsive to the first remote access cache having the data cached, the first ROB supplies a copy of the requested data from the first remote access cache to the requesting node within the first group, and responsive to receiving the requested data from the second group that received the directory lookup request, discarding the requested data from the second group.

4. The method of claim 1 further comprising:

responsive to the first remote access cache not having the data cached, responsive to receiving the requested data from the other group that received the directory lookup request, installing the requested data from the other group in the first remote access cache and supplying a copy of the requested data to the requesting node within the first group.

5. The method of claim 4 wherein installing the requested data from the other group in the remote access cache comprises overwriting an existing cache line entry with the requested data.

6. The method of claim 1 further comprising:

receiving the directory lookup request at a second group in the network; and adding the requesting node to a list of sharers for the requested data.

7. A system for manipulating requests for shared data in a computer network having a plurality of groups of nodes comprising:

means for receiving a request for shared data from a node within a first group wherein each group of the plurality has a plurality of nodes, each node having a plurality of processors;

means for, responsive to a busy state of a first remote access cache (RAC) for the first group for storing only clean remote data marked Shared indicating read-only access wherein the clean remote data is received from another group in the computer network, bypassing the first remote access cache and means for sending a directory lookup request for the same data to another group; and means for, responsive to the first remote access cache being free, issuing simultaneously a first request for the same shared data to the first remote access cache (RAC) for the first group and a directory lookup request to another group for the same shared data, and means for, responsive to the first remote access cache having the data cached, supplying a copy of the requested data from the first remote access cache to the requesting node within the first group, and responsive to receiving the requested data from the other group that received the directory lookup request, means for discarding the requested data from the other group.

8. A method for manipulating requests for shared data in a computer network having a plurality of groups of nodes comprising:

receiving a request for shared data from a node within a first group wherein each group of the plurality has a plurality of nodes, each node having a plurality of processors;

responsive to a busy state of a first remote access cache (RAC) for the first group for storing only clean remote data marked Shared indicating read-only access wherein the clean remote data is received from another group in the computer network, bypassing the first remote access cache and sending a directory lookup request for the same data to another group; and responsive to the first remote access cache being free, issuing simultaneously a first request for the same shared data to the first remote access cache (RAC) for the first group and a directory lookup request to another group for the same shared data, and responsive to the first remote access cache having the data cached supplying a copy of the requested data from the first remote access cache to the requesting node within the first group, and responsive to receiving the requested data from the other group the received the directory lookup request, discarding the requested data from the other group.

* * * * *

UNITED STATES PATENT AND TRADEMARK OFFICE
CERTIFICATE OF CORRECTION

PATENT NO. : 6,766,360 B1
DATED : July 20, 2004
INVENTOR(S) : Patrick N. Conway

It is certified that error appears in the above-identified patent and that said Letters Patent is hereby corrected as shown below:

Title page,
Item [56], References Cited, U.S. PATENT DOCUMENTS, please add:

-- US 2003/0005070 A1     01-02-2003     Narasimhamurthy et al. --

Column 10,
Line 29, please replace "that" with -- the --.

Signed and Sealed this

Twenty-eighth Day of December, 2004

JON W. DUDAS
*Director of the United States Patent and Trademark Office*